US009407365B2

(12) United States Patent
Yang et al.

(10) Patent No.: US 9,407,365 B2
(45) Date of Patent: Aug. 2, 2016

(54) LIGHTING DEVICE AND RECEIVER

(75) Inventors: Hongming Yang, Eindhoven (NL); Tim Corneel Wilhelmus Schenk, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 81 days.

(21) Appl. No.: 14/115,524

(22) PCT Filed: Apr. 26, 2012

(86) PCT No.: PCT/IB2012/052081
§ 371 (c)(1),
(2), (4) Date: Nov. 4, 2013

(87) PCT Pub. No.: WO2012/153220
PCT Pub. Date: Nov. 15, 2012

(65) Prior Publication Data
US 2014/0072310 A1   Mar. 13, 2014

(30) Foreign Application Priority Data
May 6, 2011   (EP) .................................... 11165095

(51) Int. Cl.
H04B 10/00   (2013.01)
H04B 10/04   (2006.01)
H04B 10/116   (2013.01)
(Continued)

(52) U.S. Cl.
CPC .......... *H04B 10/116* (2013.01); *H05B 33/0845* (2013.01); *H04B 10/1141* (2013.01)

(58) Field of Classification Search
None
See application file for complete search history.

(56) References Cited

U.S. PATENT DOCUMENTS 6,661,975 B1 * 12/2003 Hall ..................... H04B 10/118
398/177
7,016,612 B1 *  3/2006 Ikeda .................. H04B 10/541
398/129
(Continued)

FOREIGN PATENT DOCUMENTS

CN           101395826 A    3/2009
NL     WO 2010064175 A1 *  6/2010   ......... H05B 33/0809
(Continued)

OTHER PUBLICATIONS

Sadr et al., Detection of Signals by the Digital Integrate-and-Dump Filter with Offset sampling, 1987, p. 158, 169.*

*Primary Examiner* — Ken N Vanderpuye
*Assistant Examiner* — Jai Lee
(74) *Attorney, Agent, or Firm* — Meenakshy Chakravorty

(57) ABSTRACT

There is provided a method and corresponding lighting device (100), and a receiver, which employs code modulation which provides a compatibility of code modulation in a dimmable lighting system. The lighting device comprises means for dimming the output light (102), which employs multiple dimming modes, each representing dimming the light output from lighting device by means of a respective dimming method, and means for embedding a code in the light output (103). The means for embedding a code in the light output employs code modulation which is based on controlling the instantaneous dimmed light output from the lighting device such that the integrated value of the dimmed light output during a time period T is modulated to embed the code. The code may then subsequently be extracted from the modulated light by means of an integrate-and-dump process at a receiver, without knowledge of the dimming method and/or dimming level of the lighting device.

14 Claims, 3 Drawing Sheets

(51) Int. Cl.
*H05B 33/08* (2006.01)
*H04B 10/114* (2013.01)

(56) References Cited

U.S. PATENT DOCUMENTS

| | | | |
|---|---|---|---|
| 2008/0193139 A1* | 8/2008 | Bettesh | A61B 1/041 398/128 |
| 2009/0196613 A1* | 8/2009 | Linnartz | H04B 10/11 398/78 |
| 2010/0045478 A1* | 2/2010 | Schulz | H04B 10/1143 340/12.22 |
| 2010/0188004 A1* | 7/2010 | Baggen | H04B 10/1141 315/209 R |
| 2010/0322635 A1* | 12/2010 | Klinghult | H04B 10/11 398/132 |
| 2011/0069965 A1* | 3/2011 | Kim | H04B 10/1149 398/130 |
| 2012/0045219 A1* | 2/2012 | Langer | H04B 10/1141 398/182 |
| 2012/0045221 A1* | 2/2012 | Walewski | H04B 10/1141 398/191 |
| 2012/0087676 A1* | 4/2012 | Lim | H04B 10/116 398/182 |

FOREIGN PATENT DOCUMENTS

| | | |
|---|---|---|
| WO | 2006079199 A1 | 8/2006 |
| WO | 2009112996 A2 | 9/2009 |
| WO | 2010064175 A1 | 6/2010 |
| WO | 2010116289 A1 | 10/2010 |
| WO | 2010124917 A1 | 11/2010 |
| WO | 2010125093 A1 | 11/2010 |
| WO | 2010145722 A1 | 12/2010 |

* cited by examiner

LIGHTING DEVICE AND RECEIVER

FIELD OF THE INVENTION

The present invention relates to the field of code modulated lighting devices, and more particularly to a lighting device employing multiple dimming modes and a code modulation method, receiver, and lighting system for such a lighting device.

BACKGROUND OF THE INVENTION

Visible light communications can bring significant benefit to realize various intelligent lighting applications, such as easy commissioning, state information read out, and point and control etc., for light emitting diode (LED) lighting modules. One of the key challenges for designing a visible light modulation method is that the data modulation shall be compatible with the lighting functionalities, i.e. such that the data modulated into the light emitted are generally invisible for the human eye.

In particular, many advanced LED lighting systems allow lighting functionalities like dimming, e.g. for the sake of energy saving in an office environment or ambience creation in a restaurant.

There are three main dimming methods for LEDs, namely amplitude modulation dimming (AM-D), pulse width modulation dimming (PWM-D), and pulse density modulation dimming (PDM-D). Taking the dimming capability into account, one shall in practice typically design a data modulation method for a particular dimming method at a low cost and with minimum effect on the lamp efficiency. For instance, for compatibility with AM-D, one can modulate the amplitude of the light output around the desired light level for the purpose of data communication. As another instance, with respect to PWM-D, one can choose to modulate the widths or positions of consecutive pulses to embed data in the light signal. Different modulation methods are preferable for different dimming modes, since a low implementation cost and minimum loss in the lamp efficiency can be achieved with such consistency between the data modulation and lamp dimming methods.

An additional challenge, however, arises when a single lighting device is arranged to provide dimming with more than one dimming method, which may be applicable to increase the efficiency of the lighting device. A two mode dimming method, e.g. allowing both AM-D and PWM-D methods for dimming of the same lighting device for different situations is known. Typically, the selected dimming method may be set e.g. in response to which dimming level is requested.

Further, known visible light communication (VLC) schemes for LED lighting systems target at a fixed one or two mode dimming method and a corresponding fixed data modulation approach which are known to a receiver prior to the data reception process. In these fixed dimming mode and fixed data modulation approaches, the receiver always needs to acquire the dimming information, e.g. which dimming mode is used, of a lighting device prior to the data reception process, i.e. extraction of data modulated in the light, which is cumbersome, if not impossible.

From a data communication point of view, it would be desirable for a receiver to work independently with different dimming levels and dimming methods.

SUMMARY OF THE INVENTION

It is an object of the present invention to overcome the problems above, and to provide a compatible data modulation method, a lighting device and a corresponding receiver, which are able to work blindly, i.e. without a-priori-knowledge of which dimming level and dimming method are used.

The inventive concept is based on providing a compatible amplitude modulation of the light output from lighting devices which employ two or more dimming modes, which compatible amplitude modulation in a receiver of light from such lighting device allows extraction of the data modulated in the light without a-priori-knowledge of the dimming mode and dimming methods used in the lighting device.

This and other objects are achieved by providing a lighting device, a receiver and method having the features defined in the independent claims. Preferred embodiments are defined in the dependent claims.

According to a first aspect of the inventive concept there is provided a lighting device comprising at least one light source for providing a light output, and dimming means for providing dimming of the light output by means of a present dimming mode selected from a multiple of dimming modes. Each dimming mode is associated with a predetermined dimming method. The lighting device further comprises embedding means for embedding a code in the dimmed light output, which embedding means are arranged for controlling the instantaneous dimmed light output such that the integrated value of the dimmed light output during a time period T is modulated to embed the code.

Thereby, a lighting device is provided in which the different dimming modes used for dimming of the light output are compatible, in that different dimming modes and thereby different dimming methods may be employed for the same light source. By providing that regardless of which dimming mode is employed, an integrated light output power in a period of time T is modulated to embed the data information, a receiver for receiving light outputted from the lighting device can perform data extraction without the need of knowing the specific dimming method that is being used.

According to an embodiment of the lighting device, the code is modulated into the dimmed light output such that it is extractable by means of an integrate-and-dump process. This provides a convenient extraction method, which for a modulated light signal modulated using the compatible modulation method above, i.e. modulating the integrated light output power in a period of time, advantageously results in the same extracted code for e.g. a code modulation by means of amplitude modulation as well as for code modulation by means of pulse-width modulation.

According to an embodiment of the lighting device, the present dimming mode is selected in response to a requested light output level DL for the light source. Since the modulation to embed data, i.e. the code, is done in a manner in which the present dimming mode is indifferent to a receiver for receiving light from the light source, data extraction may be done without knowing the present dimming level. Thus, the dimming level is merely used for setting the present dimming mode at the lighting device.

According to an embodiment, two dimming modes are employed in the lighting device. A first mode is employed when the requested light output value DL is below a predetermined threshold level, and a second mode is employed when the requested light output value is above the predetermined threshold level. This is advantageous for providing a high power efficiency and yet accurate dimming. As an example, in an envisioned lighting device of the present inventive concept, being a LED lighting module, AM-D may be employed when the light output is dimmed down from 100% light output to, e.g., 10% light output, for the purpose of high power efficiency and yet achieving sufficiently accurate dimming. When the light output is further dimmed, i.e. below 10%, it is no longer preferable to use AM-D. The reason is that it is often difficult and costly to make a power source that provides accurate and yet stable low driving current for the lighting module. Instead, a different dimming method, such as PWM-D, may be employed. In PWM-D, the power source is periodically switched off by a percentage of the total time, while maintaining the (nominal) driving current when the power source is switched on. In this way, accurate and reliable deep dimming can be achieved.

According to an embodiment of the lighting device, the modulation to embed the code is done by means of (or through) a code modulation scheme associated with the present dimming mode.

According to an embodiment of the lighting device, when the present dimming mode is the first mode a first code modulation scheme is employed, and if the present dimming mode is the second mode, a second code modulation scheme is employed.

According to an embodiment of the lighting device, the dimming methods each provides one of an amplitude modulation dimming, pulse width modulation dimming, and pulse density modulation dimming.

According to a second aspect of the inventive concept, there is provided a receiver comprising means for receiving a signal originating from a lighting device according to inventive concept, and means for extracting the code in the received signal by means of (or through) an integrate-and-dump process. By performing the integrate-and-dump process on the signal received from the lighting device according to the present inventive concept, the receiver can operate to perform the data reception without the knowledge of the specific dimming level and dimming method that is being used in the lighting device.

According to an embodiment of the receiver, the received signal is a light signal LS and the receiver further comprises means for converting the received light signal to an electrical signal before entering the means for extracting the code.

According to an embodiment of the receiver, the integrate-and-dump process comprises for a number of time periods of length T for each time period (i) integrating the received signal during the time period T, and (ii) registering the resulting integrated value of the received signal during the time period. The sequence of the registered resulting integrated values is associated with the code.

According to an embodiment of the receiver, it further comprises a clock synchronization unit for synchronizing the integrate-and-dump process, which is advantageous.

According to an embodiment of the receiver, it is further arranged for performing estimation on the signal strength received from the lighting device, which may be useful in specific lighting applications.

Further, there is provided a lighting system comprising one or more lighting devices and one or more receivers according to the present inventive concept.

According to a third aspect, there is provided a code modulation method for a light source employing multiple dimming modes. Each respective dimming mode represents dimming the light output from the light source by means of a respective dimming method. The code modulation method comprises controlling the instantaneous dimmed light output, when being dimmed with a present dimming mode being selected from the multiple dimming modes, such that the integrated value of the dimmed light output during a time period T is modulated to embed a code.

The method may further comprise detecting a present dimming mode being employed. The modulation to embed the code is done by means of a code modulation scheme associated with the present dimming mode.

According to an embodiment of the method, it further comprises, preferably externally from the light source like in a receiver, extracting the code from the light output. The step of recovering the code comprises processing light outputted from the lighting device, e.g. a portion of the dimmed light output as received by a receiver, by means of an integrate-and-dump process.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention, of which drawings.

DETAILED DESCRIPTION

The present inventive concept is based on providing a code modulation method, herein under referred to as Compatible Amplitude Modulation, CAM, which provides a compatibility of code modulation in a dimmable lighting system. The CAM is based on in a lighting device, which may employ multiple dimming modes, each representing dimming the light output from the lighting device by means of a respective dimming method, controlling the instantaneous dimmed light output from the lighting device such that the integrated value of the dimmed light output during a time period T is modulated to embed a code. The code may then subsequently be extracted from the outputted modulated light by means of an integrate-and-dump process, without knowledge of the dimming method and/or dimming level of the lighting device.

Figure 1:
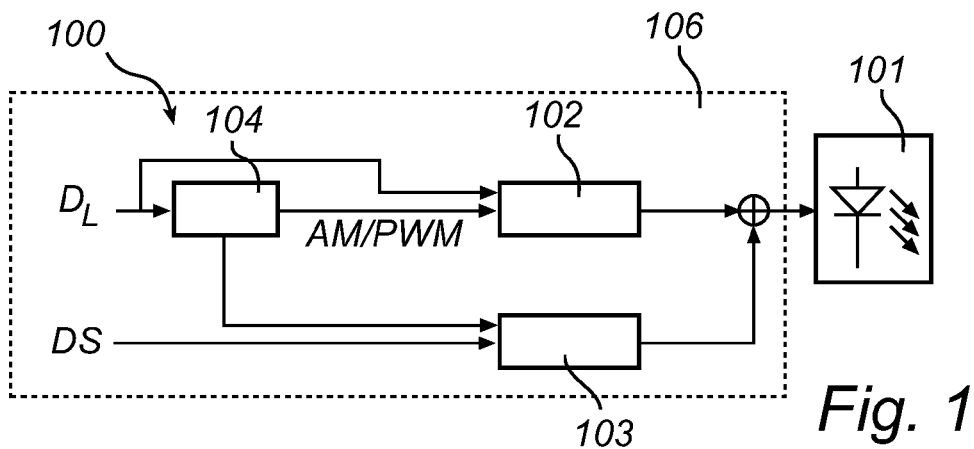
FIG. 1 is a schematic block diagram illustrating an embodiment of a lighting device according to the present inventive concept.

As a way of illustration, CAM is first described for a lighting device utilizing two modes of dimming. FIG. 1, details a schematic block diagram of an embodiment of a lighting device 100 according to the present inventive concept. The lighting device comprises a light source 101, which here comprises a light emitting diode, LED, which is powered electrically by a driver 106. The light source may alternatively comprise more LEDs, or may alternatively be based on HID lamps (high intensity discharge), halogen lamps, incandescent lamps, and/or fluorescent tubular lamps.

The driver 106 determines the dimming level and switches on and off the light source 101. The driver comprises electronic software and hardware for providing power to the light source, and further comprises suitable processing capabilities like at least one processor, and optionally at least one memory circuit. Below, only the functionalities of driver are described by different means involving selecting, processing, coding etc. The functionalities may be realized by software or hardware.

The driver 106 comprises or is optionally part of a processing unit such as a central processing unit (CPU). A single processor or other unit may fulfill the functions of several items recited in the claims.

The driver 106 is arranged with means for selecting a present dimming mode, which here is illustrated as box 104. Based on information received over an optional (one-way) communication interface (not shown), the dimming level DL or switching on/off of the light source is controlled. Here, box 104 retrieves the requested dimming level value DL from the communication interface, being e.g. a remote control, a computerized control system, or a manual dimmer control. Depending on the requested dimming level value DL, a predetermined dimming method is selected. For this exemplifying embodiment, if the dimming level DL is selected to be less than a predetermined threshold level, f.i. 10% of the maximum light output from the lighting device, PWM-D is to be utilized as dimming method. If the dimming level DL is selected to be at or above the predetermined threshold level, AM-D is to be utilized as dimming method. In alternative embodiments the predetermined threshold level may be set at f.i. 80%, 75%, 50%, 40%, 33% or 20% of the maximum light output. In other words, for dimming levels DL above the threshold level the light source is driven with a DC current commensurate with the dimming level requested (i.e. a certain percentage of the nominal current corresponding to 100% light output) and modulated around that current level (see FIGS. 3a&b). For dimming levels below the threshold, the light source is driven with a PWM modulated current where the "on current" equates to the DC current commensurate with the threshold level and the PWM duty cycle defines dimming levels at (duty cycle=100%) or below (duty cycle<100%) the threshold level (see FIGS. 2a&b).

The lighting device 100 further comprises dimming means for providing dimming of the light output, i.e. circuitry for providing AM-D or PWM-D dimming current generation, here illustrated by box 102. The present selection of dimming method as selected in box 104 is thus employed in box 102 together with information of the requested dimming level DL, which box 102 then outputs a dimmed driving current for the light source.

The driving circuitry for the light source 101 further comprises embedding means for embedding a code in the light output, which embedding means are here represented by box 103. The modulation method used in the data embedding is here selected in response to the present dimming mode. Data regarding the present dimming mode is here retrieved from box 104. Further, the actual data to be embedded into the light output is retrieved from a data source DS, which may be provided via e.g. control circuits within the lighting device itself, a remote control, or a computerized control system for a lighting system which the lighting device is part of. Data may be associated with e.g. an identification code of the lighting device, current lighting settings, current lighting measurements of the lighting device, data relating to the lighting device, such as the number of burning hours of the light source 101, or any external data, e.g. communication data, such as text data, music or speech, video data, sensor data from f.i. a temperature sensor a voltage sensor, a current sensor, a photo-sensor, etc.

The dimmed driving current from box 102 and the data embedding current from box 103 are generated in independent circuits and are combined at the input to the light source, LED 101. Essentially, the total light power in a time interval T is fluctuated to embed digital data. For instance, a higher total light power in a T interval means a bit "1" and a lower total light power in a T interval means a bit "0". However, the average light power across much longer periods of time is still equal to the value indicated by the desired diming level. The time interval T may range from (approximately) 10 ns to (approximately) 1 ms, depending on the data to be embedded and the lighting application applied. This corresponds to bits rates between ~100 Mbit/s to ~1 kbit/s. Preferably, the time interval T ranges from 100 ns to 100 μs is and more preferably from 1 μs to 10 μs.

As long as the above description is satisfied, one has the freedom regarding specific implementation of this data embedding method. For instance, one can simultaneously generate light waveforms that satisfy both the dimming and data embedding, which will be described below. Or, one can as in the lighting device 100 take a two-step approach, by first generating the dimmed driving current in box 102, and then modifying the signal for the data embedding.

Figure 2A:
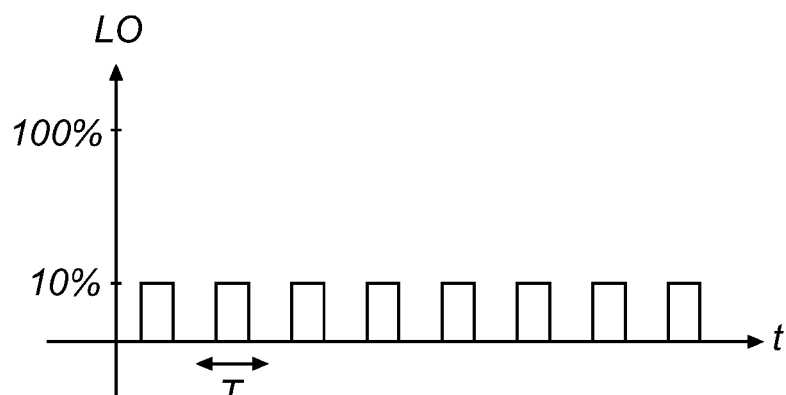
FIGS. 2a-b are time diagrams illustrating an embodiment of a code modulation method according to the present inventive concept, here being a binary Compatible Amplitude Modulation, when employing Pulse-Width-Modulation-Dimming mode, PWM-D mode.
Figure 2B:
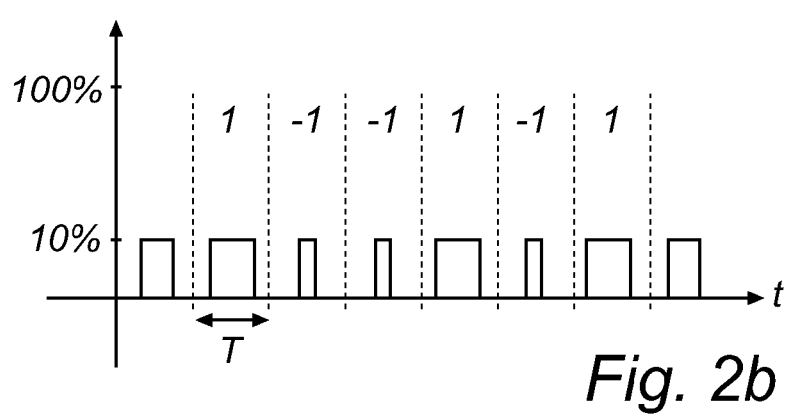

The lighting device 100 may utilize a binary code modulation, i.e. the data is a sequence of data values selected from $\{-1, 1\}$. This is described with reference to FIG. 2. FIGS. 2a-b are time diagrams illustrating an implementation of the CAM, when employing PWM-D mode in the light source. FIG. 2a illustrates the driving current as provided by box 102, which is pulse modulated—thus PWM-D-dimming is selected in box 104—to provide a dimming level of about 5% of the maximum light output (100%) of the light source 101. In this case, as an example, the threshold level is set at 10% and the PWM duty cycle is about 50%. For each time period T (corresponding to $1/f_{PWM}$ the PWM frequency) each pulse is then modulated with the CAM, to embed a respective data value. The data sequence modulated onto the dimmed driving current and visible in FIG. 2b which illustrates the modulated dimmed driver signal, is here $\{*, 1, -1, -1, 1, -1, 1, *\}$, where * represents "no data", thus the first and the last time periods visible in FIG. 2b contain no data modulation of the driving current. The driver signal, and thus the associated light output, during a "no data" interval is determined by the specific dimming mode and dimming level that are being used. For instance, in the PWM dimming mode, the "no data" signal can be set to be consisting of a pulse train with a non-fluctuating duty cycle whose value is determined by the dimming level.

Figure 3A:
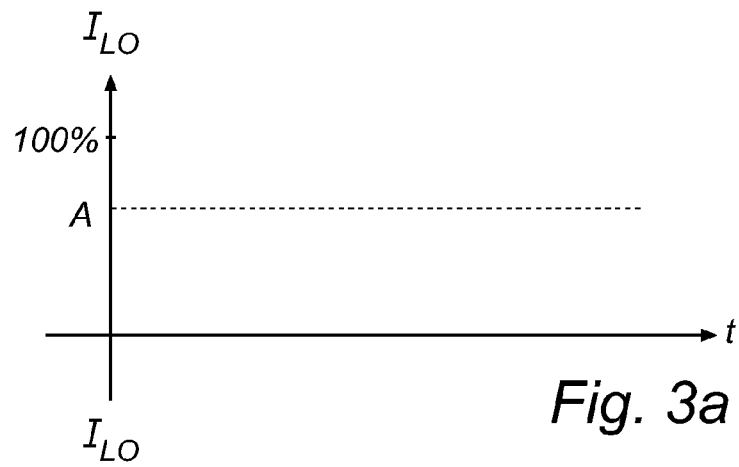
FIGS. 3a-b are time diagrams illustrating an embodiment of a code modulation method according to the present inventive concept, being a binary Compatible Amplitude Modulation, when employing Amplitude-Modulation-Dimming mode, AM-D mode.
Figure 3B:
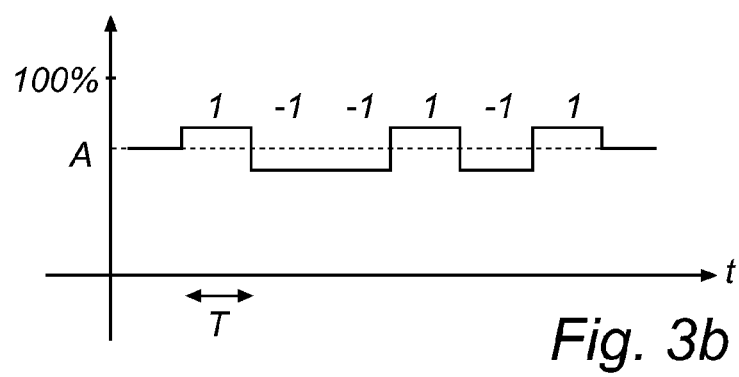

To continue, when the dimming level DL of the lighting device 100 is selected to be above the threshold level, AM-D-dimming is employed, as described above. The implementation of CAM for this driving mode for lighting device 100, is now described with reference to FIG. 3. FIGS. 3a-b are time diagrams illustrating an implementation of the CAM, when employing AM-D mode in the light source. FIG. 3a illustrates the driving current as provided by box 102, which is amplitude modulated, thus AM-D-dimming is selected in box 104, to provide a total light output of A % of the maximum light output (100%) of the light source 101. For each time period T the dimmed light output is then modulated with the CAM, to embed a respective data value. The data sequence modulated onto the dimmed driving current and visible in FIG. 3b which illustrates the modulated dimmed driver signal, is here $\{*, 1, -1, -1, 1, -1, 1, *\}$, where * represents "no data", thus the first and the last time periods visible in FIG. 3b contain no data modulation of the driving current. The code modulation is here done by means of amplitude modulation of the average light level outputted from the lighting device. Typically the modulation depth is between 1% and 20% in dependence of the signal-to-noise ratio required and illumination boundary conditions allowed for the lighting system. As mentioned above for PWM dimming mode, the driver signal, and thus the associated light output, during a "no data" interval is determined by the specific dimming mode and dimming level that are being used. In the AM dimming mode, the "no data" signal can be set to be consisting of a DC (direct current) signal whose value is determined by the dimming level.

Figure 4A:
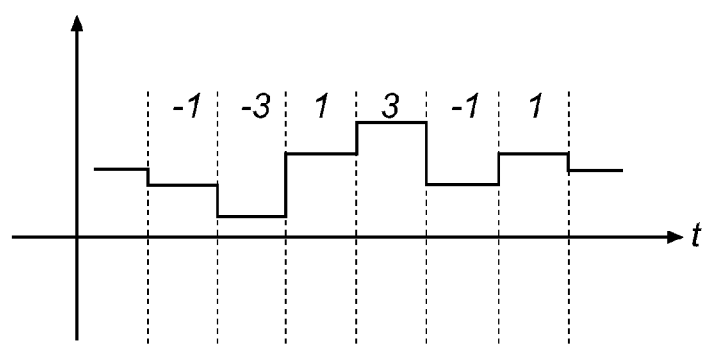
FIG. 4a-b show time diagrams illustrating a 4-level Compatible Amplitude Modulation, when employing a) Amplitude Modulation Dimming mode, AM-D, and b) Pulse-Width-Modulation-Dimming mode, PWM-D mode.
Figure 4B:
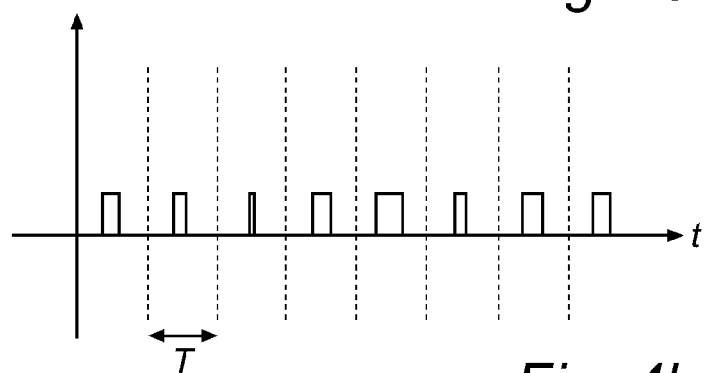

CAM is suitable for other code modulations than binary code modulations, and in FIGS. 4a and b, a 4-level modulation is illustrated for an AM-D-mode driving signal (FIG. 4a), and a PWM-D-mode driving signal (FIG. 4b). Four different symbols {−3, −1, 1, 3} are coded into the dimmed driving signal. Note that the number of code levels is not limited to any specific set of numbers in the present inventive concept.

In all cases of CAM employed to the lighting device as described above, although the instantaneous light power output of the lighting is fluctuating due to the data embedding requirement, the average light output across a longer period of time (>T), e.g. 0.01 second, is maintained to be same and according to the dimming level requirement. In essence, human eyes should only perceive the dimming of the LED lamps while the data embedding process should be invisible to human eyes.

Figure 5:
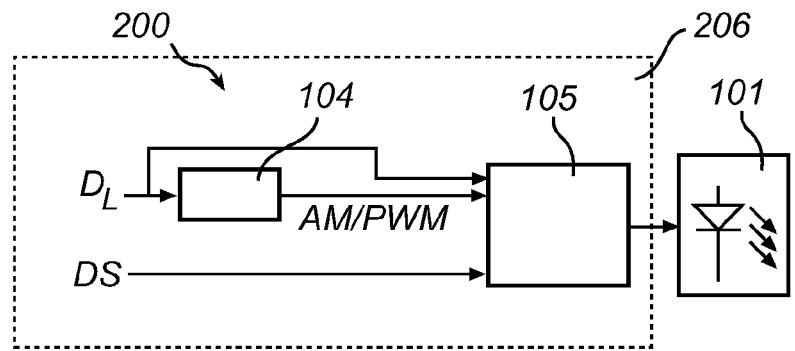
FIG. 5 is a schematic block diagram illustrating an embodiment of a lighting device according to the present inventive concept.

As mentioned above, the driving current for the light source may be generated by a single (logic) circuit through jointly considering the dimming levels and data embedding requirements. Such an embodiment of a lighting device according to the present inventive concept is illustrated in FIG. 5. FIG. 5 details a schematic block diagram of an embodiment of a lighting device 200 according to the present inventive concept. The lighting device 200 comprises a light source 101, which here comprises a light emitting diode, LED, which is powered electrically by a driver 206. Alternatively, the light source may be a lamp of the types mentioned above in conjunction with FIG. 1. The driver 206 determines the dimming level and switches on and off the light source 101. The driver 206 is, as previously described for the lighting device in FIG. 1, arranged with means for selecting a present dimming mode, which is illustrated as box 104. Based on information received over an optional (one-way) communication interface (not shown), the dimming level DL or switching on/off of the light source is controlled. Box 104 retrieves the requested dimming level value DL from a suitable communication interface.

The lighting device 200 further comprises means for providing dimming and coding of the light output, i.e. circuitry for providing AM-D or PWM-D dimming current generation and data embedding means, here illustrated by box 105. The present selection of dimming method as selected in box 104 is thus employed in box 105 together with information of the requested dimming level DL, and data to be embedded in the signal is retrieved from a data source DS, in a similar manner as for lighting device 100, as discussed above with reference to FIG. 1. Box 105 then outputs a dimmed driving current which is CAM modulated to drive the light source 101.

The modulation method used in the data embedding is here selected in response to the present dimming mode. Data regarding the present dimming mode is retrieved from box 104.

Figure 6:
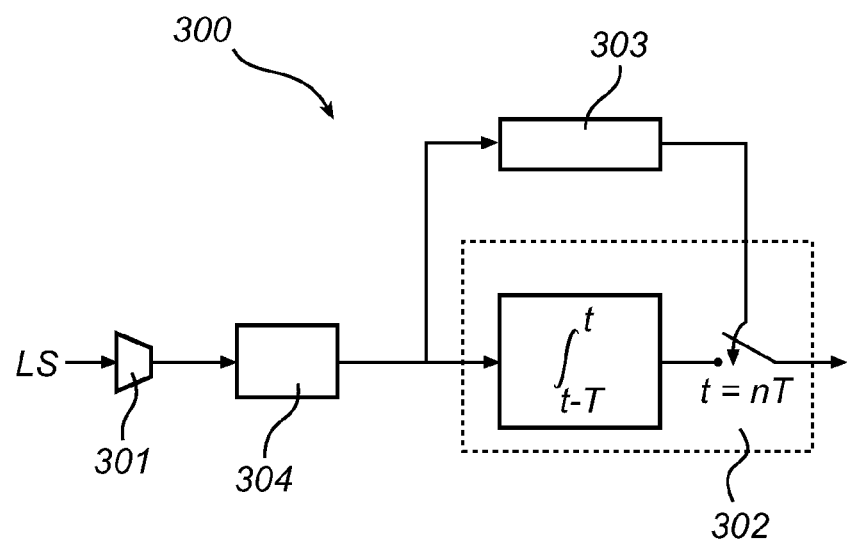
FIG. 6 is a schematic block diagram illustrating an embodiment of a receiver according to the present inventive concept.

The lighting devices described above outputs light which is dimmed and coded. To extract the data embedded in the light, the present inventive concept further concerns a receiver. FIG. 6 is a schematic block diagram of an embodiment of a receiver 300 according to the inventive concept. The receiver 300 comprises a light sensor 301 for receiving a signal LS originating from a lighting device according to the present inventive concept, which is optionally connected to a converter 304 for optical electrical conversion of the signal LS. The light sensor and converter may alternatively be integrated in a single sensor unit. The receiver 300 further comprises means for processing the received signal by means of an integrate-and-dump process and further for extracting the code from the output from the means for processing the received signal, here illustrated by box 302. The integrate-and-dump process comprises for a number of time periods of length T: for each time period integrating the received signal during the time period T, and registering the resulting integrated value of the received signal during the time period. The sequence of the registered resulting integrated values is associated with the embedded code. At the output of this integrate-and-dump processing and extraction of the embedded code, both the two modulated light signals from the lighting device, as illustrated in FIG. 2b and FIG. 3b, result in the same code sequence at the rate of 1/T, as identified above.

Optionally, the receiver 300 comprises a clock synchronization unit 303, which is arranged for obtaining an exact value of T. Even though a receiver should know the pre-defined ideal value for T, the actual value of T from a specific lighting device may be subject to a certain level of inaccuracies due to real circumstances, such as temperature, humidity, etc. Therefore, the role of the clock synchronization unit 303 in the receiver is to recover the actual value T, which is close to the ideal pre-defined value. To aid this clock synchronization process, it is common practice to prefix a known periodical sequence to the data sequence for a receiver to recover the exact value of T for this corresponding transmitter, i.e. here the lighting device.

It should be mentioned that other aspects of the receiver, like analog and digital filtering, low noise amplification, and the decoding of potentially used line coding, error control coding, and parity check coding schemes, etc., are beyond the scope of this invention.

According to an embodiment of the receiver, in addition to data reception and code extraction, the receiver is arranged to perform estimation on a signal strength of light received from a lighting device.

The receiver and the lighting devices, as described above, may comprise or be part of a processing unit such as a central processing unit (CPU). A single processor or other unit may fulfill the functions of several items recited in the claims.

The person skilled in the art realizes that the present invention by no means is limited to the preferred embodiments described above. On the contrary, many modifications and variations are possible within the scope of the appended claims. For instance, the person skilled in the art may realize that in an embodiment of the invention, the PWM-D mode is arranged such that the PWM current pulse train does not switch between zero and $I_{threshold}$, as described above, but instead between zero and the maximum allowed current of the system $I_{nominal}$. The duty cycle will simultaneously have to be set at a smaller value by a factor of $I_{nominal}/I_{threshold}$ to achieve the required dimming level. This option may work well for relatively large dimming levels DL (i.e. relatively close to 100% light output), but will be difficult to achieve at very low dimming levels (i.e. relatively close to 0% light output) as very low duty cycles are difficult/expensive to implement.

The invention claimed is:

1. A lighting device comprising:
   at least one light source for providing a light output,
   a dimming component for providing dimming of said light output using a present dimming mode selected from a multiple of dimming modes, wherein each dimming mode is associated with a respective predetermined dimming method from a multiple of different dimming methods employable by the lighting device, and
   an embedding component for embedding a code in said dimmed light output with a modulation method selected from a plurality of modulation methods, said embedding component configured to control the instantaneous dimmed light output such that the integrated value of said dimmed light output during a time period T is modulated to embed said code and is configured to be demodulated by a receiver without a-priori knowledge of the dimming method selected, wherein the modulation method is selected according to the dimming method associated with the present dimming mode.

2. The lighting device according to claim 1, wherein said code is modulated into said dimmed light output such that it is extractable using an integrate-and-dump process.

3. The lighting device according to claim 1, wherein said present dimming mode is selected in response to a requested light output level (DL) for said light source.

4. The lighting device according to claim 3, when comprising two dimming modes, wherein a first mode is employed when said requested light output value (DL) is below a predetermined threshold level, and a second mode is employed when said requested light output value is above said predetermined threshold level.

5. The lighting device according to claim 4, wherein said modulation to embed said code is done by means of a code modulation scheme associated with said present dimming mode.

6. The lighting device according to claim 5, wherein if said present dimming mode is said first mode a first code modulation scheme is employed, and if said present dimming mode is said second mode, a second code modulation scheme is employed.

7. The lighting device according to claim 6, wherein said multiple of different dimming methods comprise amplitude modulation dimming, pulse width modulation dimming, and pulse density modulation dimming.

8. A receiver comprising:
   a light sensor for receiving a signal originating from the lighting device according to claim 1; and
   a processor for extracting said code by means of an integrate-and-dump process.

9. The receiver according to claim 8, wherein said received signal is a light signal (LS) and the receiver further comprises converter for converting said received light signal to an electrical signal before entering said means for extracting the received signal.

10. The receiver according to claim 8, wherein said integrate-and-dump process comprises for a number of time periods of length T:
    for each time period integrating the received signal during said time period T; and
    registering the resulting integrated value of said received signal during said time period,
    wherein the sequence of said registered resulting integrated values is associated with said code.

11. The receiver according to claim 10, further being arranged for performing estimation on the signal strength received from said lighting device.

12. A lighting system comprising:
    at least one lighting device according to claim 1,
    at least one receiver comprising a light sensor for receiving a signal originating from the at least one lighting device, and
    a processor for extracting said code by means of an integrate-and-dump process.

13. A code modulation method for a lighting device employing multiple dimming modes, wherein each respective dimming mode represents dimming the light output from said light source using a respective dimming method from a multiple of different dimming methods employable by the lighting device, said code modulation method comprising:
    controlling the instantaneous dimmed light output from said lighting device, when being dimmed with a present dimming mode being selected from said multiple dimming modes such that the integrated value of said dimmed light output during a time period T is modulated to embed a code and is configured to be demodulated by a receiver without a-priori knowledge of the dimming method selected, according to the selected present dimming mode.

14. The code modulation method according to claim 13, further comprising extracting said code from said light output, wherein said step of recovering said code comprises processing a received portion of said dimmed light output by means of an integrate-and-dump process.

* * * * *